May 14, 1963  G. W. BLANFORD  3,089,168
SELF-SERVICE AUTOMATIC VEHICLE-WASHING DEVICES
Filed Aug. 14, 1961  3 Sheets-Sheet 1

INVENTOR.
GEORGE W. BLANFORD,
BY
George A. Schwinger
ATTORNEY

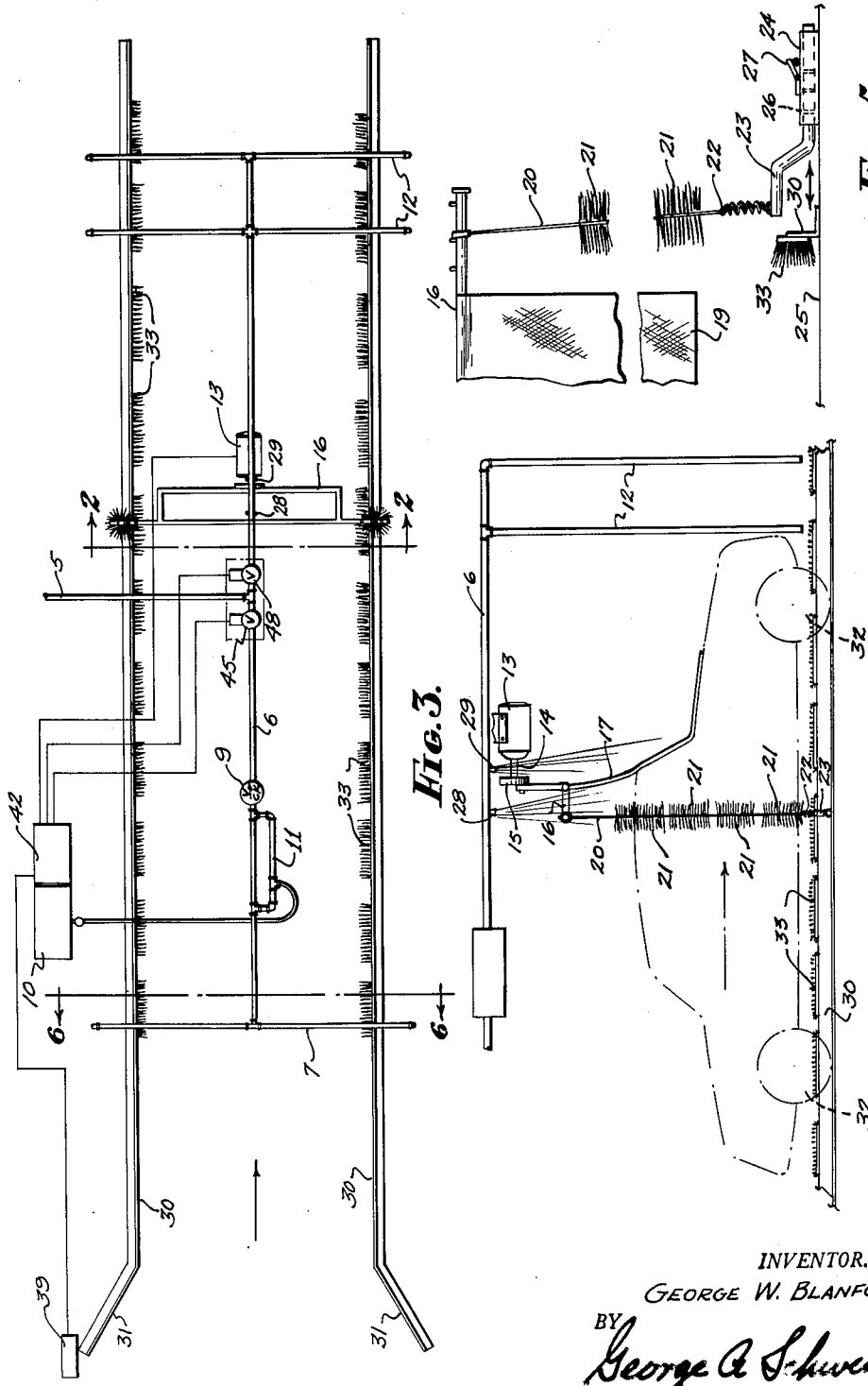

May 14, 1963 G. W. BLANFORD 3,089,168
SELF-SERVICE AUTOMATIC VEHICLE-WASHING DEVICES
Filed Aug. 14, 1961 3 Sheets-Sheet 3

INVENTOR.
GEORGE W. BLANFORD,
BY
George A. Schwinger
ATTORNEY.

United States Patent Office 3,089,168
Patented May 14, 1963

3,089,168
SELF-SERVICE AUTOMATIC VEHICLE-WASHING DEVICES
George W. Blanford, Cincinnati, Ohio, assignor of fifty-five percent to John H. Blocksom, five percent to Samuel J. Ginsberg, and five percent to George A. Schwenzer, all of Cincinnati, Ohio
Filed Aug. 14, 1961, Ser. No. 131,384
5 Claims. (Cl. 15—4)

My invention relates to vehicle-washing devices that permit a driver of a vehicle to pace the vehicle through a cyclic washing process that is actuated by means of coins deposited by the driver of the vehicle preliminary to driving through the washing device.

It is an object of my invention to provide a coin actuated automatic vehicle-washing process and device whereby the washing and cleaning of the vehicle is accomplished without manual assistance during the washing and cleaning of the vehicle.

Another object of my invention is to provide an automatic self-service car washing system that is actuated by coins deposited by a driver of a vehicle and the vehicle being driven through the cycles, of cleaning, washing and wipe off, by the driver of the vehicle.

These and other objects of my invention will become more apparent in the description and the drawings illustrating the preferred embodiment of my device and process.

In the drawings:

FIGURE 3 is a diagrammatic plan view of piping, electric wiring, giant automatic wiper, body and wheel brushes.

FIGURE 4 is a side elevation showing body brushes and giant automatic wiper draped upon a vehicle.

FIGURE 5 is a fragmentary elevation of the wiper, brushes and supports.

Present day rapid vehicle washing devices are relatively prohibitive because of the initial high cost of installation and time required for washing. They require special buildings and accessories. In all cases they require considerable man power for applying detergents, scrubbing and wiping the vehicles after washing. As a consequence the charge for washing vehicles is such that owners of automobiles do not utilize the rapid car washing facilities as often as desired or required.

With my device, because of the elimination of all manual attendance and service during washing, it is possible to reduce the charge to wash a vehicle to a very nominal amount and a vehicle can be washed three to four times, with my device, for the same charge now prevalent in the present day rapid car washing methods and also reduce the time of washing a considerable amount.

Figure 1:
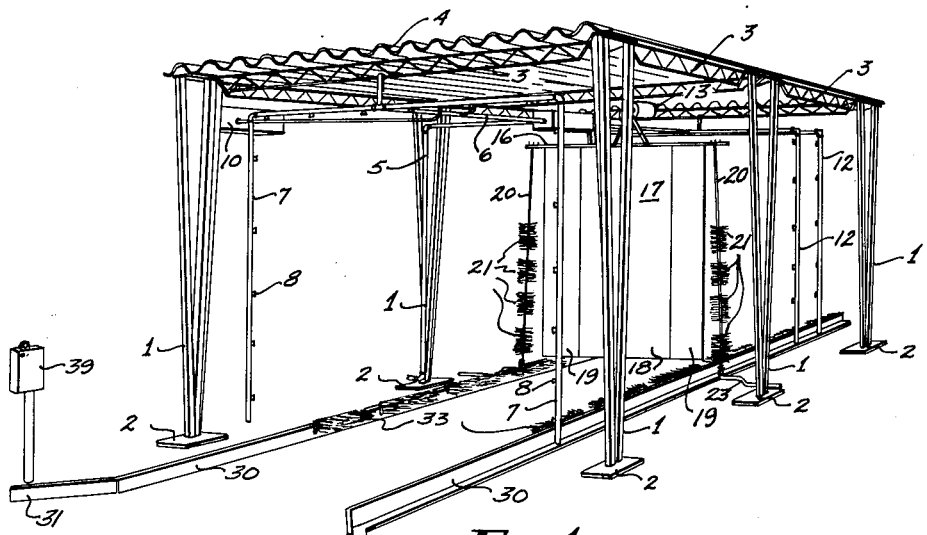
FIGURE 1 is a perspective view of my vehicle washing device.
Figure 2:
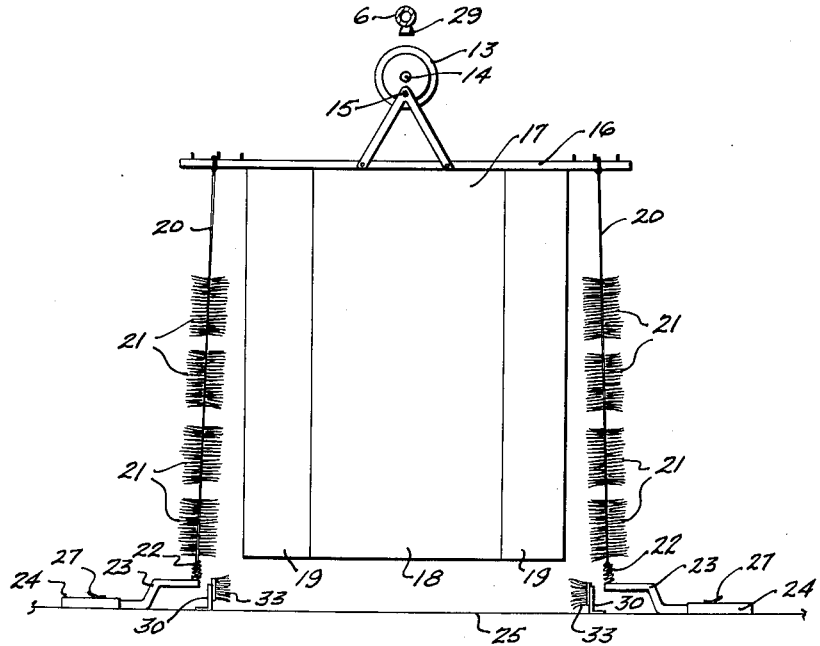
FIGURE 2 is a view of my giant automatic wiper in elevation taken on line 2—2 of FIGURE 3.
Figure 6:
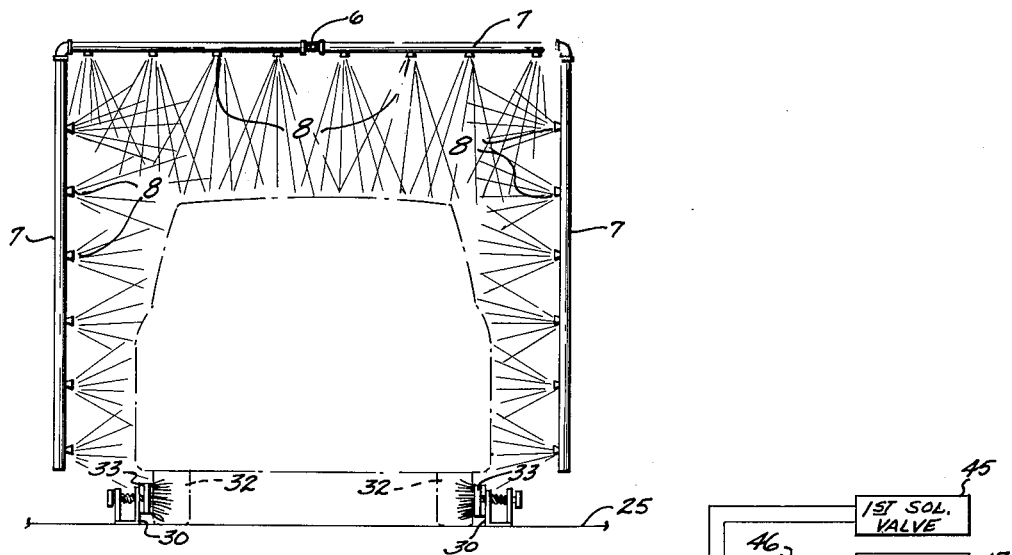
FIGURE 6 is a front elevation of a vehicle showing the relative position of a spray arm surrounding a vehicle taken on line 6—6 of FIGURE 3.
Figure 7:
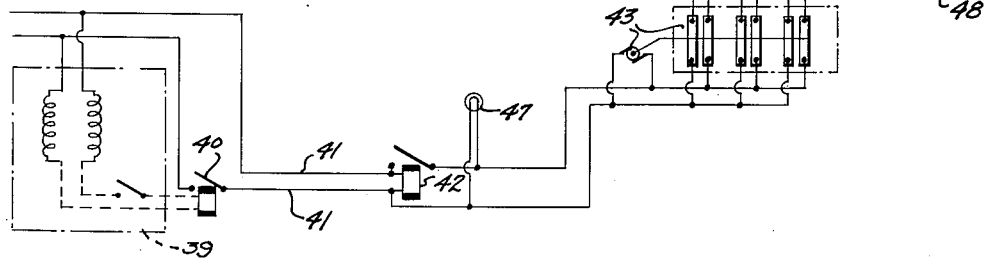
FIGURE 7 is an electric wiring diagram.
Figure 8:
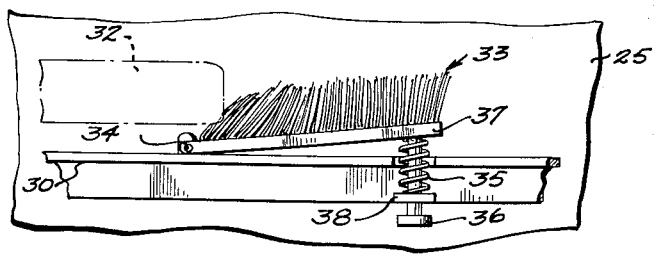
FIGURE 8 is a fragment detail of the tiltable wheel brushes.

Referring to FIGURE 1 there are vertical posts 1 secured to base plates 2 of sufficient area to substantially maintain the posts erect and self-supporting position. Secured to and connecting each of the posts are girders 3 upon which is secured decking 4. Siding, not shown, will be secured to the posts to confine the splattering spray within the car wash housing area. Suspended from and secured to the girders is the piping consisting of a water supply main 5 connecting to a longitudinal main 6 branching towards both ends of the housing. All of the piping will be wrapped with electric heating tape and covered with plastic insulation. This will impart heat to the water within the pipes by induction while it is static and/or flowing in the pipes to provide heated water for low temperature and wintery days. An inverted U pipe 7 with a multiple of spaced spray nozzles 8 is at the left or entrance end of FIGURES 1 and 3. The line 6 (see FIGURE 3) has a check valve 9 which allows the mixed water and detergent to flow to the U pipe 7 but it prohibits the back-up of water and detergent mixture after the water has passed the check valve. Supported on the housing there is a reservoir 10 for storing a supply of my special detergent that is streakless and fast drying. The reservoir is connected to the line 6 through a by-pass 11 that forms a syphon and mixing chamber for the detergent as the water flows through to the U spray frame 7. Attached to the reservoir there is a measuring device that regulates and controls the amount of detergent used during a washing. The detergent is prevented from flowing to the right of FIGURE 3 by the check valve 9. At the right end of the housing there are two more inverted U spray frames 12. These spray frames are for final spray to wash away all dirt, detergent and muck. Fixed to the ceiling of the housing is a motor with an extending shaft 14 to which is fixed an eccentric stud 15 upon which is rotatably mounted a frame 16 that is jiggled vertically and oscillated sidewise by the rotation of the eccentric. Suspended from and secured to the frame and actuated by it is my giant automatic wiper 17 of a material having a nap of limited moisture retention capacity such as synthetic materials to minimize the weight of the wiper while it is in operation. The wiper has a wide central panel section 18 and two narrower side panel sections 19. This allows the central panel section to drape about and contour to the wider surfaces of a vehicle and also wipe and scrub the surfaces while the car is passing through the washing device.

The side panel sections also perform scrubbing and wiping action and the separation into panels permits the mitten to pass over all protruding devices and accessories attached to the vehicle. Adjustably suspended on the frame 16 and offset from the vertical edge center of the wiper are flexible cables 20 upon which are mounted brushes 21. The brushes are suspended so as to be in contact with the vehicle and because of the flexible cables to contact and conform to the contour of the vehicle while it passes between the brushes. The brushes are actuated by the eccentric jiggling and oscillating in unison with the wiper and scrubbing the sides of the vehicle thereby releasing any muck or dirt preliminary to rinsing. Bottom ends 22 of the flexible cables are resiliently secured to a slidable arm 23. The arm is slidably mounted in a hollow bracket 24 that is fixed to a floor 25. The arm has multiple spaced indents 26 for a hinged pin 27 adapted to engage in the indents on the arm and position the brushes away from or towards the longitudinal center of the washing device. The brushes are adjustable to variable widths of vehicles to be washed. In order to keep the wiper moist and relatively clean of grit there are spray heads in line 6 for spraying both sides of the wiper while it is in operation. Spaced tracks 30 with flared entrance guiding ends 31 are spaced outside of tires 32 and secured to the floor. Sectional brushes 33 are tiltably mounted on hinges 34 that are secured to the tracks and the brushes are spaced along the entire length of the tracks. A compression spring 35 is slidably mounted over a stud 36. The stud is secured to a brush holder 37 and slidable in a bracket 38 to actuate the brushes and force them against the tires on the wheels of the vehicle. This produces scrubbing and cleaning action on the wheels as they rotate while passing through the washing cycles. The washing process is actuated by inserting two coins successively into a coin rejector 39 located at a distance from the solvent spray pipe equal to the distance from the front of the machine and the driver's seat. After placing the coins in the rejector the driver moves the car slowly forward and a relay switch 40 closes and energizes the primary circuit 41 which in turn energizes and closes a time limit delay relay switch 42 that allows a motor and a rotary switch 43 to be energized and operated through one complete revolution. Simultaneously with the closing of the time limit relay switch a red signal light 47 is lit. This light will remain lit throughout a complete cycle of washing. The light together with a warning sign prevents the insertion of coins in the rejector while a washing cycle is in progress. Upon rotation of the rotary switch a circuit 44 will be energized and actuate a solenoid valve 45 that starts the water and detergent spraying over the vehicle to be washed. As the vehicle progresses through it will be completely sprayed with the detergent solution. After the lapse of a certain period of time another contact segment on the rotary switch energizes another circuit 46 and causes the motor 13 to drive the eccentric to jiggle and oscillate the giant wiper and brushes which are in contact with the vehicle body. The motion of the brushes, together with the detergent, will loosen, wipe and brush away muck and dirt from the body of the vehicle. The continued rotation of the rotating switch closes a third circuit 47 which energizes and actuates another solenoid valve 48 thereby allowing water to flow through main line 6 to the inverted U spray pipes 12 at the exit of the housing for final rinsing of the vehicle. Prior to the turning on the solenoid valve 48 the solenoid valve 45 will have closed and stopped the flow of the detergent.

Experience and testing have disclosed that with my special nonstreaking and quick drying solvent no final wiping off is necessary and after a short time of exposure to air the vehicle has a clean non-streaked appearance. With my invention it is possible to wash a vehicle in not more than thirty seconds. Since this is a self-service process, it takes very little practice for persons to gage the rate of speed through washing to synchronize the movement of the car with the cycles of washing operations. The entire car, including the tires, gets a cleaning in a very short period of time and at a nominal charge.

Having thus described my invention I claim:

1. A self-service washing device for a vehicle comprising an elongated longitudinal housing, guide tracks within said housing for guiding a vehicle through said housing, positioned exterior of rubber tire wheels on a vehicle, brushes resiliently mounted on said tracks for scrubbing the tire wheels, a water spraying system having electric solenoid actuated valves and spaced inverted U spray frames at an entrance and exit of said housing, one of said inverted U sprays adapted to spray a mixture of detergent and water while a vehicle is passing through said housing upon timed actuation of one of said solenoid valves, said detergent syphoned from a reservoir in measured quantity by the flow of the water to and out of the said inverted U frame at the entrance of said housing, a motor driven eccentric interspaced between said inverted U frames rotatably supporting a wiper and brush to jiggle and oscillate said wiper and brushes while a vehicle passes through and in contact with said brushes and wiper within said housing and another of said inverted U frames adapted to spray said vehicle with water upon exit from said housing when one of said solenoid valves is actuated in timed sequence.

2. A self-service washing device for a vehicle comprising an elongated longitudinal housing, guide tracks within said housing for guiding a vehicle through said housing, positioned exterior of rubber tire wheels on a vehicle, brushes resiliently mounted on said tracks for scrubbing the tire wheels, a water spraying system having electric solenoid actuated valves and spaced inverted U spray frames at an entrance and exit of said housing, one of said inverted U sprays adapted to spray a mixture of detergent and water while a vehicle is passing through said housing upon timed activation of one of said solenoid valves, said detergent syphoned from a reservoir in measured quantity by the flow of the water to and out of the said inverted U frame at the entrance of said housing; a motor driven eccentric interspaced between said inverted U frames rotatably supporting a wiper and brushes to jiggle and oscillate said wiper and brushes while a vehicle passes through and in contact with said brushes and wiper within said housing and another of said inverted U frames adapted to spray a vehicle with water upon exit from said housing when one of the said solenoid valves is actuated in timed sequence, and a motor actuated rotary switch adapted to close circuits to the solenoid valves and motor driven eccentric in timed sequence.

3. A self-service washing device for a vehicle comprising an elongated longitudinal housing, guide tracks within said housing for guiding a vehicle through said housing, positioned exterior of rubber tire wheels on a vehicle, brushes resiliently mounted on said tracks for scrubbing the tire wheels, a water spraying system having electric solenoid actuated valves and spaced inverted U spray frames at an entrance and exit of said housing, one of said inverted U sprays adapted to spray a mixture of detergent and water while a vehicle is passing through said housing upon timed activation of one of said solenoid valves, said detergent syphoned from a reservoir in measured quantity by the flow of the water to and out of the said inverted U frame at the entrance of said housing; a motor driven eccentric interspaced between said inverted U frames rotatably supporting a wiper and brushes to jiggle and oscillate said wiper and brushes while a vehicle passes through and in contact with said brushes and wiper within said housing and another of said inverted U frames adapted to spray a vehicle with water upon exit from said housing when one of the said solenoid valves is actuated in timed sequence, and a motor actuated rotary switch adapted to close circuits to the solenoid valves and motor driven eccentric in timed sequence, said motor actuated rotary switch adapted to actuate the detergent spray valve for a given period and overlapping the starting time of the actuation of the eccentric, deactivating the detergent spray solenoid prior to the operating time lapse of the eccentric, and activating said solenoid valve to said other inverted U frame at the exit of said housing prior to the operating time lapse of said eccentric and finally deactivating the exit solenoid valve to complete the spraying and washing cycle.

4. A self-service washing device for a vehicle comprising an elongated longitudinal housing, guide tracks within said housing for guiding a vehicle through said housing, positioned exterior of rubber tire wheels on a vehicle, brushes resiliently mounted on said tracks for scrubbing the tire wheels, a water spraying system having electric solenoid actuated valves and spaced inverted U spray frames at an entrance and exit of said housing, one of said inverted U sprays adapted to spray a mixture of detergent and water while a vehicle is passing through said housing upon timed activation of one of said solenoid valves, said detergent syphoned from a reservoir in measured quantity by the flow of the water to and out of the said inverted U frame at the entrance of said housing; a motor driven eccentric interspaced between said inverted U frames rotatably supporting a wiper and brushes to jiggle and oscillate said wiper and brushes while a vehicle passes through and in contact with said brushes and wiper within said housing and another of said inverted U frames adapted to spray a vehicle with water upon exit from said housing when one of the said solenoid valves is actuated in timed sequence, and a motor actuated rotary switch adapted to close circuits to the solenoid valves and motor driven eccentric in timed sequence, said motor actuated rotary switch adapted to actuate the detergent spray valve for a given period and overlapping the starting time of the actuation of the eccentric, deactivating the detergent spray solenoid prior to the operating time lapse of the eccentric, and activating said solenoid valve to said other inverted U frame at the exit of said housing prior to the operating time lapse of said eccentric and finally deactivating the exit solenoid valve to complete the spraying and washing cycle, and a coin rejector adapted to energize a timed limit switch upon the insertion of two coins in sequence and energize the motor driven rotary timing switch at the start of the vehicle washing.

5. A self-service washing device for a vehicle comprising an elongated longitudinal housing, guide tracks within said housing for guiding a vehicle through said housing, positioned exterior of rubber tire wheels on a vehicle, brushes resiliently mounted on said tracks for scrubbing the tire wheels, a water spraying system having electric solenoid actuated valves and spaced inverted U spray frames at an entrance and exit of said housing, one of said inverted U sprays adapted to spray a mixture of detergent and water while a vehicle is passing through said housing upon timed activation of one of said solenoid valves, said detergent syphoned from a reservoir in measured quantity by the flow of the water to and out of the said inverted U frame at the entrance of said housing, a motor driven eccentric interspaced between said inverted U frame rotatably supporting a wiper and brushes to jiggle and oscillate said wiper and brushes while a vehicle passes through and in contact with said brushes and wiper within said housing and another of said inverted U frames adapted to spray a vehicle with water upon exit from said housing when one of the said solenoid valves is actuated in timed sequence, and a motor actuated rotary switch adapted to close circuits to the solenoid valves and motor driven eccentric in timed sequence, said motor actuated rotary switch adapted to actuate the detergent spray valve for a given period and overlapping the starting time of the actuation of the eccentric, deactivating the detergent spray solenoid prior to the operating time lapse of the eccentric, and activating said solenoid valve to said other inverted U frame at the exit of said housing prior to the operating time lapse of said eccentric and finally deactivating the exit solenoid valve to complete the spraying and washing cycle, and a coin rejector adapted to energize timed limit switch upon the insertion of two coins in sequence and energize the motor driven rotary timing switch at the start of the vehicle washing and said timed switch adapted to deenergize the entire electric circuits at the end of the vehicle washing cycle.

References Cited in the file of this patent
UNITED STATES PATENTS

| | | |
|---|---|---|
| 2,242,692 | Yingling | May 20, 1941 |
| 2,751,915 | Roberts | June 26, 1956 |
| 2,781,765 | Steidley | Feb. 19, 1957 |
| 2,973,769 | Jacobs et al. | Mar. 7, 1961 |